Inventor
Bernard P. McDonnell
By Robert B. Benson
Attorney

United States Patent Office 3,362,695
Patented Jan. 9, 1968

3,362,695
LIQUID AERATION METHOD AND APPARATUS
Bernard P. McDonnell, Milwaukee, Wis., assignor to Allis-Chalmers Manufacturing Company, Milwaukee, Wis.
Filed Apr. 15, 1964, Ser. No. 359,992
6 Claims. (Cl. 261—92)

This invention relates generally to liquid aeration devices and more particularly to a system utilizing a plurality of disklike members rotating in a vessel partially filled with high pressure gas. Such a device is frequently referred to as a two-phase contactor. More specifically, this invention relates to a system utilizing a two-phase contactor for treating a small portion of a body of water and saturating this water with a high degree of oxygen and returning the treated water to the main body of liquid in such a manner that the entire body of water achieves an acceptable degree of oxygen content.

It has been suggested in the prior art that the aeration of large bodies of liquid can be attained by diverting a small amount of liquid from the main body through an aerator operating under high pressure to dissolve relatively large volumes of oxygen into the water being treated and then return this small volume of treated water to the main body. One of the problems anticipated in connection with this type of treating system is to properly mix the treated water with the main body of water so as to attain an acceptable oxygen level for the entire main stream. Applicant has solved this problem by selectively tapping a small percentage of liquid from the main body to be treated, saturating this diverted portion of liquid with a high concentration of oxygen and then diffusing this liquid back into the body of water being treated at widely separated points and at a controlled rate so that the liquid with the high concentration of oxygen is dispersed in a manner to bring the oxygen concentration in the entire body of liquid being treated to an acceptable level.

Therefore, it is the object of this invention to provide a new and improved aeration system for large bodies of liquid.

Another object of this invention is to provide a new and improved apparatus for aerating large bodies of water.

Other objects and advantages of this invention will be observed from the following description when read in connection with the accompanying drawing, in which.

Figure 1:
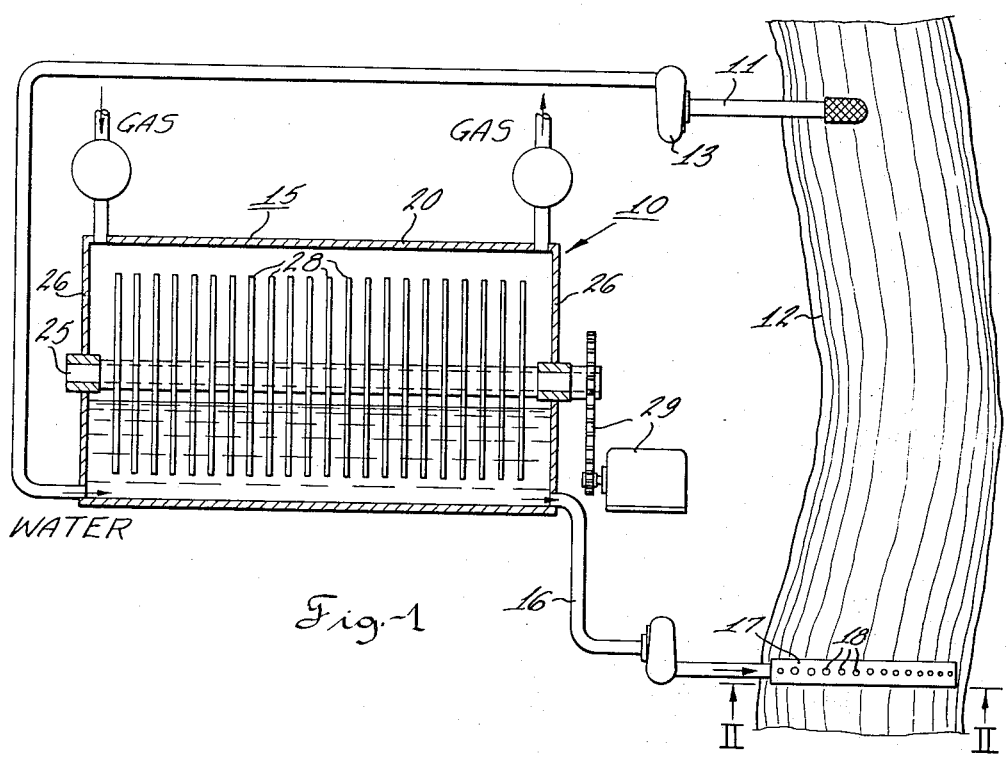
FIG. 1 is a schematic drawing showing the apparatus and system of this invention.

This invention is illustrated in connection with apparatus for aerating a stream of polluted water. The apparatus 10 includes a conduit 11 for diverting a small portion of liquid from the stream 12 to the aeration device. A pump 13 is shown for taking liquid out of the stream, but in many applications where the speed of liquid in the stream is sufficient, such a pump will not be necessary. The diverted liquid is directed into the aeration device illustrated as two-phase contactor 15 for dissolving oxygen, air or other appropriate gas into the diverted liquid. From the two-phase contactor 15 the treated water flows through a second conduit 16 to a diffuser 17 which is located in the bottom of the body of liquid being treated. An additional pump can be provided in conduit 17 if needed to deliver the treated liquid to the diffuser at the proper pressure.

The diffuser 17 has a plurality of spaced apart outlets 18 for directing the treated liquid into various portions of the stream at a specified rate. To this end the outlets on the diffuser have openings of different sizes or have means for varying the size of the openings so as to control the amount of liquid flowing out of each of the outlets. For example, more treated liquid would be discharged in areas of the stream where the liquid is flowing faster or is deeper to balance the volume of treated liquid with the volume of liquid to be aerated.

In some cases it may be desirable to conduct the enriched liquid to an intermediate tank on container and allow it to remain in the intermediate container for a selected period of time before returning it to the main body of liquid. Such a procedure allows time for the gas to react in the enriched liquid before it is returned to the main body.

The two-phase contactor 15 illustrated in connection with this apparatus consists of a totally enclosed pressure vessel 20 having the liquid to be treated in the lower portion and the gas, such as oxygen used for the treatment, in the upper portion. Suitable inlets and outlets are provided in the vessel for both the liquid and the gas. A shaft 25 is rotatably mounted in the end walls 26 of the vessel and has a plurality of axially spaced disks 28 mounted thereon. An appropriate drive unit such as the illustrated motor and chain drive 29 is provided for rotating the shaft. The disks 28 are partially submerged in the liquid in the vessel so that during rotation they pick up a film of the liquid, expose it to the gas in the other part of the vessel and return it to the liquid being treated where the film saturated with gas is washed off into the liquid.

The vessel 20 is provided with means for supplying gas under pressures exceeding one atmosphere and up to, but not limited to, ten atmospheres. It has been found that the absorption of oxygen or other gases into the film of liquid on the disk is greatly increased if the gas is under pressure. Since the primary use of the apparatus of this invention is to purify polluted bodies of water, the use of pure oxygen as the gas greatly improves the overall efficiency of the system.

Figure 2:
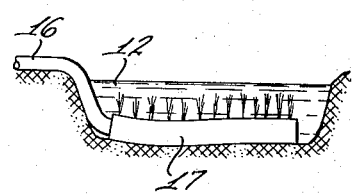
FIG. 2 is an enlarged cross sectional view of the diffuser apparatus taken along the line II—II of FIG. 1.
Figure 3:
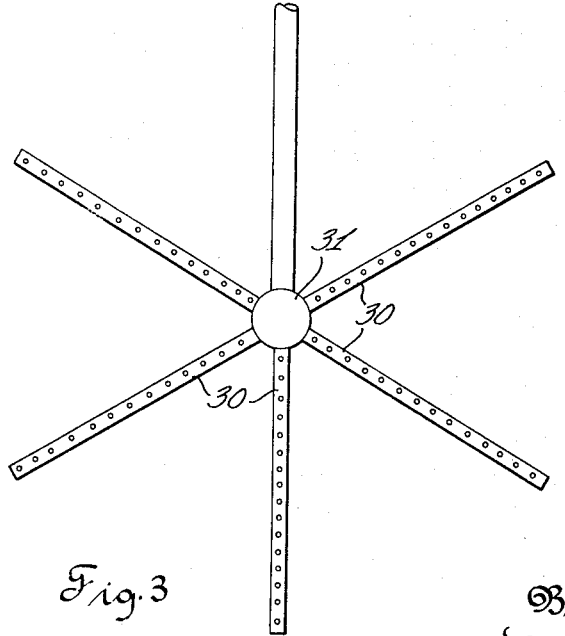
FIG. 3 is a top view of an alternate diffuser especially useful in aerating ponds or other bodies of water having little liquid movement.

Although the invention is illustrated in FIGS. 1 and 2 in connection with a stream in which the water is flowing constantly in one direction, this system and apparatus could be used to aerate a pond where there is relatively no movement of the water. In such an application, the diffuser would have more outlets into the body of liquid being treated. Such a diffuser is illustrated in FIG. 3 in which a number of arms 30 extend outwardly from a central feed point 31 to distribute the treated liquid to many widely separated points. Furthermore, it may be desirable to have means for circulating the treated liquid throughout the body of liquid being aerated to accelerate the aeration process.

Although but two embodiments of this invention have been illustrated and described, it will be apparent to those skilled in the art that various modifications and changes can be made therein without departing from the spirit of the invention or the scope of the appended claims.

Having now particularly described and ascertained the nature of my said invention and the manner in which it is to be performed, I declare that what I claim is:

1. An apparatus for aerating a stream comprising means for diverting a portion of the liquid in said stream, a two-phase contactor having a closed pressure resistant shell provided with gas inlet and outlet ports and a plurality of disks within said shell mounted on a shaft for rotation therewith, means for directing the flow of said diverted liquid into said shell to submerge a portion of each of said disks in said liquid, means for rotating said shaft, means for saturating said diverted liquid with oxygen including means for supplying an oxygen containing gas through said gas inlet port at a pressure greater than several atmospheres and for maintaining said gas above said liquid within said shell at said pressure greater than several atmospheres and for exposing the portions of said disks extending out of said liquid to said gas, a diffuser having a plurality of horizontally spaced openings immersed in said stream, and means for extracting said oxygen-saturated liquid from said shell and for delivering it to said diffuser.

2. An apparatus for aerating a body of liquid comprising means for diverting a portion of the liquid in said body, a two-phase contactor having a plurality of disks within a closed pressure resistant vessel provided with gas inlet and outlet ports and mounted on a shaft for rotation therewith, means for directing the flow of said diverted liquid into said vessel to submerge a portion of each of said disks in said liquid, means for rotating said shaft, means for saturating said diverted liquid flowing through said vessel with a gas including means for supplying said gas through said gas inlet port at a pressure greater than several atmospheres to the portion of said vessel above said liquid and for maintaining said gas within said vessel at said pressure above several atmospheres to contact the exposed portions of said disks with said gas and dissolve said gas in said liquid in said vessel, means for extracting said liquid having said gas dissolved therein from said vessel, and a diffuser connected to said extracting means and immersed in said body of liquid for distributing said liquid having said gas dissolved therein back into said body of liquid, said diffuser having a plurality of horizontally spaced apart openings and certain of said openings being of different sizes to selectively control the distribution of said liquid having said gas dissolved therein to said body.

3. The apparatus of claim 2 in which said diffuser has means for selectively controlling the output from each of said openings.

4. The method of aerating a body of liquid comprising the steps of: (1) removing a portion of liquid from said body, (2) flowing said removed portion of said liquid past a plurality of rotating disks to partially submerge said disks in said liquid, (3) saturating said removed portion of said liquid with oxygen by exposing the portions of said rotating disks extending out of said liquid to substantially pure oxygen at a pressure greater than several atmospheres to enrich said liquid with said oxygen, (4) conducting said enriched liquid from said disks back to said body, and (5) diffusing said enriched liquid at a plurality of spaced apart points into said body of liquid beneath the surface thereof.

5. The method of aerating a body of liquid comprising the steps of: (1) removing a portion of liquid from said body, (2) flowing said removed portion of liquid past a plurality of rotating disks to partially submerge said disks in said liquid, (3) saturating said removed portion of liquid with oxygen by exposing the nonsubmerged portions of said rotating disks extending out of said liquid to a gas at a pressure greater than several atmospheres having oxygen as a component thereof, whereby the portions of said rotating disks emerging from said liquid are coated with said liquid and the liquid coating is exposed to said gas under pressure and then returned to said liquid to saturate said liquid with oxygen, (4) conducting said saturated liquid from said disks to said body of liquids, (5) diffusing said saturated liquid at a plurality of spaced apart points into said body, and controlling the amount of said saturated liquid diffused into said body at said points to obtain an approximately uniform concentration of oxygen in all portions of said body.

6. The method of aerating a stream comprising the steps of: (1) removing a portion of liquid from said stream, (2) flowing said removed portion of said liquid past a plurality of rotating disks to partially submerge said disks in said liquid, (3) saturating said removed portion of liquid with oxygen by supplying air at a pressure greater than several atmospheres over the exposed portions of said rotating disks to dissolve oxygen from said air in the liquid coating on the nonsubmerged portion of said rotating disks and saturate said liquid with oxygen, (4) conducting said saturated liquid from said disks back to said stream at a point downstream from the point where it was initially removed, and (5) diffusing said saturated liquid at a plurality of spaced apart points into said stream.

References Cited
UNITED STATES PATENTS

| | | | |
|---|---|---|---|
| 363,173 | 5/1887 | Schenck | 261—93 |
| 407,036 | 7/1889 | Rigby | 210—170 |
| 1,253,401 | 1/1918 | Lorimer | 261—92 |
| 1,643,273 | 9/1927 | Imhoff | 210—170 |
| 2,077,907 | 4/1937 | Streander. | |
| 2,825,541 | 3/1958 | Moll et al. | |
| 3,173,866 | 3/1965 | Lefton et al. | 210—205 |
| 3,227,649 | 1/1966 | Ghormley et al. | 23—270.5 |

HARRY B. THORNTON, *Primary Examiner.*

E. H. RENNER, *Assistant Examiner.*